US011082460B2

(12) United States Patent
Nesta et al.

(10) Patent No.: US 11,082,460 B2
(45) Date of Patent: Aug. 3, 2021

(54) AUDIO SOURCE ENHANCEMENT FACILITATED USING VIDEO DATA

(71) Applicant: SYNAPTICS INCORPORATED, San Jose, CA (US)

(72) Inventors: Francesco Nesta, Irvine, CA (US); Boyan Bonev, San Jose, CA (US); Utkarsh Gaur, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/455,668

(22) Filed: Jun. 27, 2019

(65) Prior Publication Data
US 2020/0412772 A1  Dec. 31, 2020

(51) Int. Cl.
| | | |
|---|---|---|
| *H04L 29/06* | (2006.01) | |
| *H04S 7/00* | (2006.01) | |
| *G10L 25/78* | (2013.01) | |
| *G06T 5/00* | (2006.01) | |
| *G06K 9/00* | (2006.01) | |
| *G06F 3/01* | (2006.01) | |

(Continued)

(52) U.S. Cl.
CPC .............. *H04L 65/40* (2013.01); *G06F 3/013* (2013.01); *G06K 9/00228* (2013.01); *G06T 5/003* (2013.01); *G10L 25/78* (2013.01); *H04L 65/1066* (2013.01); *H04N 7/15* (2013.01); *H04R 1/406* (2013.01); *H04S 7/303* (2013.01); *G06T 2207/10016* (2013.01)

(58) Field of Classification Search
USPC ...................................................... 348/14.08
See application file for complete search history.

(56) References Cited

U.S. PATENT DOCUMENTS

| | | | | |
|---|---|---|---|---|
| 9,547,760 B2 * | 1/2017 | Kang | ....................... | G10L 17/10 |
| 2005/0081160 A1 * | 4/2005 | Wee | ........................ | H04H 60/33 |
| | | | | 715/755 |

(Continued)

OTHER PUBLICATIONS

Heymann et al., "Neural network based spectral mask estimation for acoustic beamforming." Acoustics, Speech and Signal Processing (ICASSP), 2016 IEEE International Conference on. IEEE, Mar. 2016, 6 pages.

(Continued)

*Primary Examiner* — Maria El-Zoobi
(74) *Attorney, Agent, or Firm* — Haynes and Boone, LLP

(57) ABSTRACT

Systems and methods for audio signal enhancement facilitated using video data are provided. In one example, a method includes receiving a multi-channel audio signal including audio inputs detected by a plurality of audio input devices. The method further includes receiving an image captured by a video input device. The method further includes determining a first signal based at least in part on the image. The first signal is indicative of a likelihood associated with a target audio source. The method further includes determining a second signal based at least in part on the multi-channel audio signal and the first signal. The second signal is indicative of a likelihood associated with an audio component attributed to the target audio source. The method further includes processing the multi-channel audio signal based at least in part on the second signal to generate an output audio signal.

20 Claims, 7 Drawing Sheets

(51) Int. Cl.
*H04N 7/15* (2006.01)
*H04R 1/40* (2006.01)

(56) References Cited

U.S. PATENT DOCUMENTS

| | | | | |
|---|---|---|---|---|
| 2011/0099017 | A1* | 4/2011 | Ure | H04N 21/4882 704/275 |
| 2012/0013620 | A1* | 1/2012 | Brown | G06T 13/40 345/473 |
| 2015/0138302 | A1* | 5/2015 | Sethi | H04N 7/15 348/14.07 |
| 2016/0127759 | A1* | 5/2016 | Jung | H04N 21/233 725/19 |
| 2016/0142647 | A1* | 5/2016 | Gopinath | H04N 21/44227 348/706 |
| 2016/0142674 | A1* | 5/2016 | Travis | H04N 7/15 348/14.07 |
| 2016/0360150 | A1* | 12/2016 | Onno | H04N 21/44218 |
| 2019/0341050 | A1* | 11/2019 | Diamant | G10L 17/00 |

OTHER PUBLICATIONS

Nesta et al., "Supervised independent vector analysis through pilot dependent components," 2017 IEEE International Conference on Acoustics, Speech and Signal Processing (ICASSP), New Orleans, LA, Mar. 2017, 6 pages.

Nesta et al., "Audio/video supervised independent vector analysis through multimodal pilot dependent components," 2017 25th European Signal Processing Conference (EUSIPCO), Kos, Aug. 2017, 6 pages.

Ephrat et al., "Looking to Listen at the Cocktail Party: A Speaker-Independent Audio-Visual Model for Speech Separation", ACM Trans. Graph., vol. 37, No. 4, Article 112, Aug. 2018, 11 pages.

Afouras et al., "The Conversation: Deep Audio-Visual Speech Enhancement", Interspeech Jun. 2018, 5 pages.

Zhang et al., "Joint Face Detection and Alignment using Multi-task Cascaded Convolutional Networks", IEEE Signal Processing Letters (SPL), Apr. 2016, 5 pages.

Kazemi et al., "One Millisecond Face Alignment with an Ensemble of Regression Trees", CVPR 2014, Jun. 2014, 8 pages.

* cited by examiner

AUDIO SOURCE ENHANCEMENT FACILITATED USING VIDEO DATA

TECHNICAL FIELD

The present application, in accordance with one or more embodiments, relates generally to audio signal processing and, more particularly, for example, audio source enhancement facilitated using video data.

BACKGROUND

Audio and video conferencing systems have gained popularity in recent years. Quality of a target audio signal is degraded in the presence of noise and/or other interference audio sounds. Such audio quality degradation may be readily noticed especially in crowded public environments, such as work office areas, call centers, cafeterias, and so forth. As such, audio enhancement solutions to enable higher audio quality for a target audio signal even in noisy environments are desirable.

SUMMARY

In accordance with various embodiments further discussed herein, systems and methods for audio signal enhancement using video data are provided. In some embodiments, such systems and methods may provide supervised audio/video architectures that allow enhancement of target audio (e.g., speech of one or more target audio sources) even in noisy environments. In some aspects, such systems and methods may be utilized to provide audio signals, and in some cases video signals, for use in voice applications, such as Voice over Internet Protocol applications.

In one or more embodiments, a method includes receiving a multi-channel audio signal including audio inputs detected by a plurality of audio input devices. The method further includes receiving an image captured by a video input device. The method further includes determining a first signal based at least in part on the image. The first signal is indicative of a likelihood associated with a target audio source. The method further includes determining a second signal based at least in part on the multi-channel audio signal and the first signal. The second signal is indicative of a likelihood associated with an audio component attributed to the target audio source. The method further includes processing the multi-channel audio signal based at least in part on the second signal to generate an output audio signal.

In one or more embodiments, a system includes a video subsystem and an audio subsystem. The video subsystem is configured to receive an image captured by a video input device. The video subsystem includes an identification component configured to determine a first signal based at least in part on the image. The first signal is indicative of a likelihood associated with a target audio source. The audio subsystem is configured to receive a multi-channel audio signal including audio inputs detected by a plurality of audio input devices. The audio subsystem includes a logic component configured to determine a second signal based at least in part on the multi-channel audio signal and the first signal. The second signal is indicative of a likelihood associated with an audio component attributed to the target audio source. The audio subsystem further includes an audio processing component configured to process the multi-channel audio signal based at least in part on the second signal to generate an output audio signal.

The scope of the present disclosure is defined by the claims, which are incorporated into this section by reference. A more complete understanding of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

Figure 1:
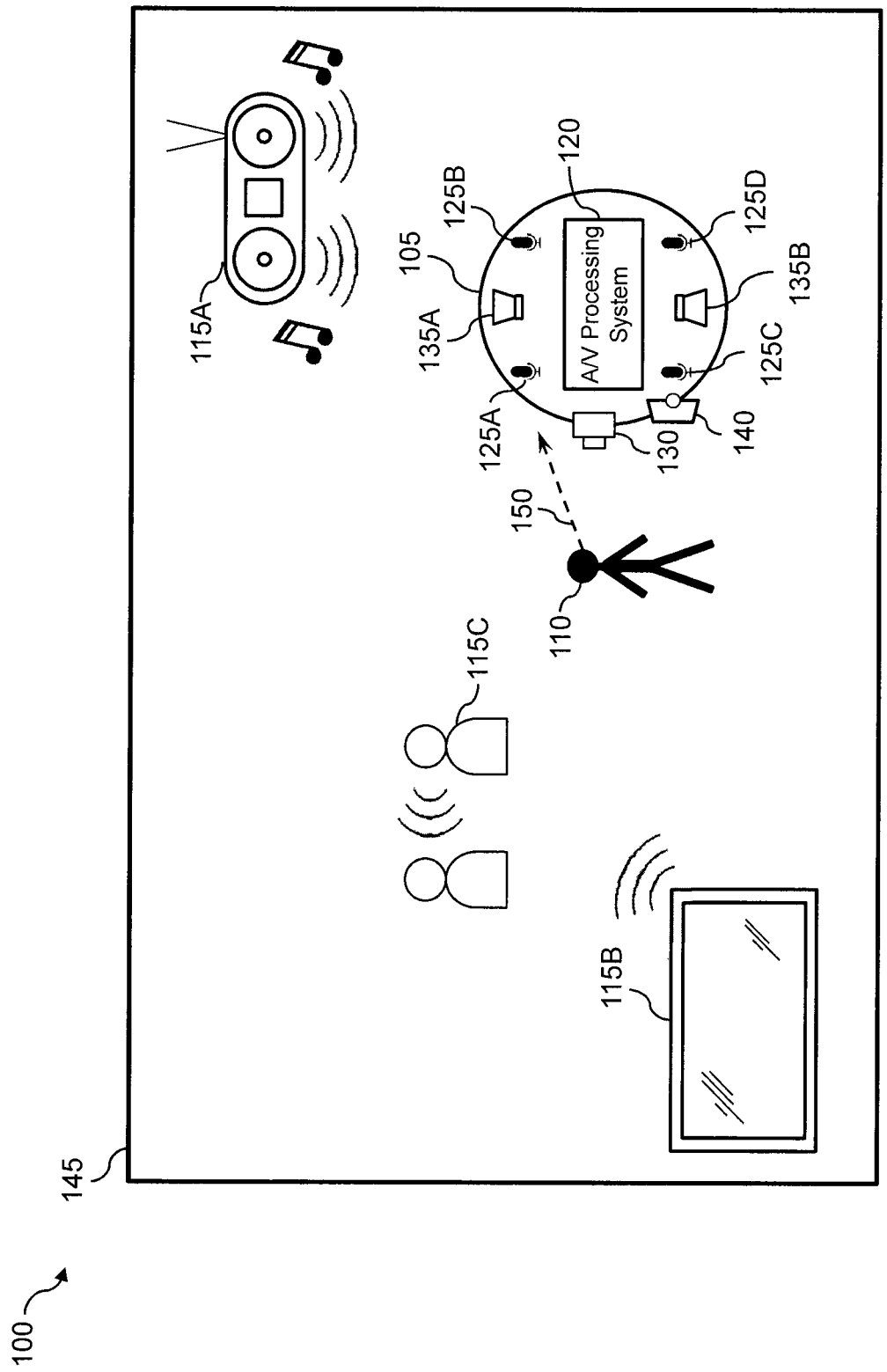
FIG. 1 illustrates an example operating environment in which a system may operate to facilitate audio source enhancement in accordance with one or more embodiments of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided herein to provide audio source enhancement that is facilitated using video data. In some embodiments, a supervised audio/video system architecture is provided herein to facilitate audio channel noise reduction using video data. In this regard, an audio modality and a video modality are utilized together to facilitate selective audio source enhancement. Using various embodiments, higher quality for target audio (e.g., speech of one or more target audio sources) may be provided even in noisy environments, relative to a case in which only the audio modality is utilized. In some aspects, the audio/video system may authenticate a certain user (e.g., a target audio source) and automatically control flow of a voice application session (e.g., a call), supervise an audio noise reduction to enhance only this authenticated user and remove unwanted surrounding noise (e.g., associated with other speakers), and automatically set a voice application session into a sleep mode when the authenticated user is not present or not engaged in the call.

Audio source enhancement techniques may be effectuated in single microphone or multi-microphone environments. Such techniques are generally utilized to enhance a target audio source and/or reduce or remove noise. In some cases, such techniques may enhance a target audio source and/or reduce or remove noise by making assumptions on a noise spatial or spectral statistic. As an example, in general for a conferencing application, audio source enhancement may be performed to enhance only speech coming from a main conference user suppressing all remaining sound. In some cases, speech coming from multiple users (e.g., each identified as a main conference user) may be enhanced while all remaining sound is suppressed.

Although the present disclosure is described primarily in association with voice applications, such as Voice over Internet Protocol (VoIP) applications, various embodiments may be utilized to facilitate audio source enhancement in any applications in which audio source enhancement may be desired. Furthermore, although the present disclosure is generally described for a multi-channel audio implementation, in some embodiments, embodiments of the present disclosure may be applied to a single channel audio implementation.

FIG. 1 illustrates an example operating environment 100 in which a system 105 may operate to facilitate audio source enhancement in accordance with one or more embodiments of the present disclosure. The operating environment 100 includes the system 105, a target audio source 110 (e.g., a voice of a user), and noise sources 115A-C. The system 105 includes an audio/video (A/V) processing system 120, audio input devices 125A-D (e.g., microphones), a video input device 130 (e.g., a camera), audio output devices 135A and 135B (e.g., speakers), and a video output device 140 (e.g., a display). In the example illustrated in FIG. 1, the operating environment 100 is illustrated as an interior of a room 145 (e.g., conference room, room of a home), but it is contemplated that the operating environment 100 may include other areas, such as an inside of a vehicle, an outdoor stadium, or an airport.

It is noted that while the system 105 is depicted as including four audio input devices, one video input device, two audio output devices, and one video output device, the system 105 may include fewer or more audio input devices, video input devices, audio output devices, and/or video output devices than shown in FIG. 1. Furthermore, while the system 105 is depicted as enclosing various of these audio and video devices, the various devices may be provided in separate housings and/or as a part of separate systems, with the audio/video processing system 120 separate from and communicatively coupled to the audio input devices 125A-D, the video input device 130, the audio output devices 135A and 135B, and/or the video output device 140. In this regard, in some aspects, the audio input devices 125A-D, the video input device 130, the audio output devices 135A and 135B, and/or the video output device 140 may be part of the audio/video processing system 120 and/or otherwise communicatively coupled to the audio/video processing system 120.

The audio/video processing system 120 may receive audio signals from the audio input devices 125A-D and video signals (e.g., video frames) from the video input device 130. The audio input devices 125A-D may capture (e.g., detect, sense) the audio signals. In some cases, the audio signals may be referred to as forming a multi-channel audio signal, with each channel being associated with one of the audio input devices 125A-D. The video input device 130 may capture (e.g., detect, sense) the video signals. The video signals may be referred to as video frames or images. The audio/video processing system 120 may process the audio signals using audio processing techniques to detect target audio 150 produced by a target audio source 110 and enhance the target audio 150. The target audio 150 is an audio component of the multi-channel audio signal. The target audio 150 may be enhanced by enhancing (e.g., increasing an amplitude and/or a clarity) the target audio 150 and/or suppressing (e.g., decreasing an amplitude) of any sounds other than the target audio 150. The audio/video processing system 120 may provide audio signals to the audio output devices 135A and/or 135B and video signals (e.g., still images or video) to the video output device 140. The audio output devices 135A and/or 135B may output the audio signals and the video output device 140 may output the video signals for consumption by one or more users.

The target audio source 110 may be a person whose voice is to be enhanced by the audio/video processing system 120. In an embodiment, the target audio source 110 may be a person who is engaged in (e.g., participating in) a voice application. For example, the person may be engaged in a VoIP call. The target audio source 110 may be referred to as an authorized user or an authenticated user (e.g., at least for purposes of the VoIP call). The target audio source 110 produces the target audio 150 (e.g., speech) that is to be enhanced by the audio/video processing system 120. Aside from the target audio source 110, other sources of audio in the operating environment 100 include the noise sources 115A-C. In various embodiments, all audio aside from the target audio 150 is processed as noise. In the example illustrated in FIG. 1, the noise sources 115A, 115B, and 115C include a loud speaker playing music, a television playing a television show, and non-target speakers having a conversion, respectively. It will be appreciated that other noise sources may be present in various operating environments.

The audio/video processing system 120 may process the multi-channel audio signal to generate an enhanced audio signal. In generating an enhanced audio signal, the audio/video processing system 120 takes into consideration that the target audio 150 and noise (e.g., produced by the noise sources 115A-C) may reach the audio input devices 125A-D of the system 105 from different directions, a location of each audio source may change over time, and the target audio 150 and/or the noise may reflect off fixtures (e.g., walls) within the room 145. For example, the noise sources 115A-C may produce noise at different locations within the room 145, and/or the target audio source 110 may speak while walking around the room 145. In some embodiments, processing of the multi-channel audio input to obtain an enhanced audio signal may be facilitated through use of the video signal from the video input device 130, as further described herein.

As an example, the audio/video processing system 120 may include a spatial filter (e.g., beamformer) that receives the audio signals, identifies a direction of the target audio 150 produced by the target audio source 110, and, using constructive interference and noise cancellation techniques, outputs an enhanced audio signal (e.g., also referred to as an enhanced target signal) that enhances the target audio 150 (e.g., speech or other sound of interest) produced by the target audio source 110. Operation of the spatial filter to detect the signal and/or enhance the signal may be facilitated through use of the video signals (e.g., data derived from the video signals).

The audio/video processing system 120 may provide the enhanced audio signal for use in a voice application, such as a speech recognition engine or voice command processor, or as an input signal to a VoIP application during a VoIP call. As an example, for explanatory purposes only, the VoIP application is considered. In various embodiments, for facilitating a transmit side, the audio/video processing system 120 may be utilized to facilitate VoIP communications (e.g., for conferencing applications) across a network. VoIP communications may include voice only (e.g., audio signals only) or may include voice and video. In some cases, the audio/video processing system 120 may process the image from the video input device 130, such as blur the image, and provide the blurred image for use in the VoIP call. The processed image may be provided for the VoIP call. For facilitating a receive side, the audio/video processing system 120 may receive signals (e.g., audio signals and, in some cases, video signals) from a remote device (e.g., directly or via a network) and output the received signals for the VoIP communications. For instance, received audio signals may be output via the audio output devices 135A and/or 135B and received video signals may be output via the video output device 140.

One or more analog-to-digital converters (ADCs) may be utilized on the transmit side to digitize analog signals (e.g., audio signals, video signals) from one or more input devices (e.g., audio input devices, video input devices) and one or more digital-to-analog converters (DACs) may be utilized on the receive side to generate analog signals (e.g., audio signals, video signals) from digital signals to be provided by one or more output devices (e.g., audio output devices, video input devices).

Figure 2:
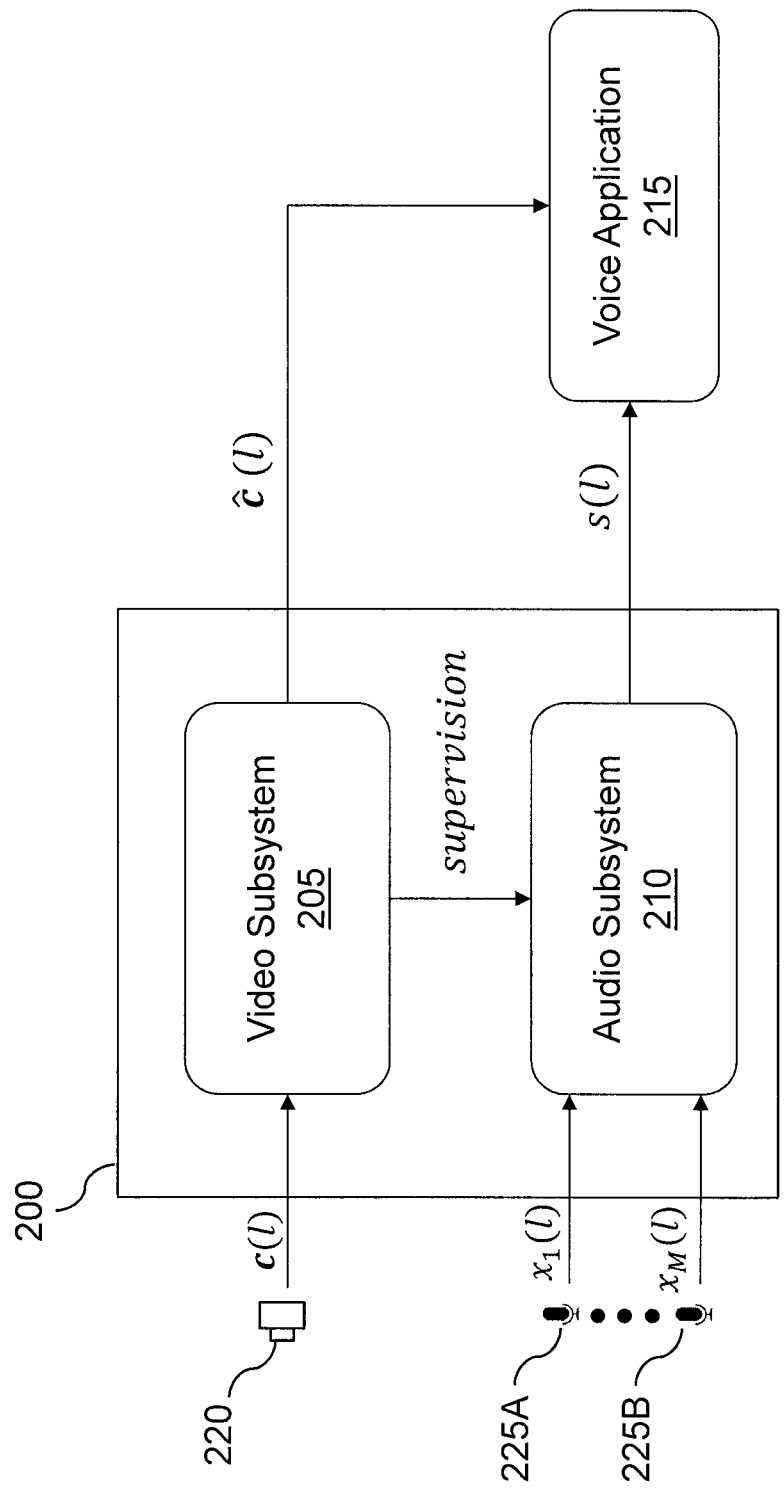
FIG. 2 illustrates a high-level diagram of an audio/video processing system for facilitating audio source enhancement in accordance with one or more embodiments of the present disclosure.

FIG. 2 illustrates a high-level diagram of an audio/video processing system 200 for facilitating audio source enhancement in accordance with one or more embodiments of the present disclosure. Not all of the depicted components may be required, however, and one or more embodiments may include additional components not shown in the figure. Variations in the arrangement and type of the components may be made without departing from the scope of the claims as set forth herein, including additional components, different components, and/or fewer components. In an embodiment, the audio/video processing system 200 may be, may include, or may be a part of the audio/video processing system 120 of FIG. 1. For explanatory purposes, the audio/video processing system 200 is described in relation to the operating environment 100 of FIG. 1, although the audio/video processing system 200 may be utilized in other operating environments.

The audio/video system 200 includes a video subsystem 205 and an audio subsystem 210. The video subsystem 205 receives as input an input video frame c(l) (e.g., an image) from a video input device 220, such as a camera, and generates an output video frame ĉ(l) and a supervision signal (denoted as supervision in FIG. 2). The video subsystem 205 provides (e.g., transmits) the output video frame ĉ(l) for use in a voice application 215, such as a VoIP application, and provides (e.g., transmits) the supervision signal to the audio subsystem 210. The output video frame ĉ(l) may be the video input frame c(l) or a processed version thereof. In an aspect, the input video frame c(l) may be blurred to obtain the output video frame ĉ(l). For example, a portion of the input video frame c(l) that does not include a target audio source may be blurred.

The audio subsystem 210 receives as input the supervision signal and a multi-channel audio input signal formed of a set of M audio signals $x_1(l), \ldots, x_M(l)$ detected by an array of audio input devices in an operating environment, where l denotes a time sample. Each audio signal may be provided by a corresponding audio input device and may be associated with an audio channel (e.g., also referred to simply as a channel). In FIG. 2, an audio input device 225A provides an audio signal $x_1(l)$ and an audio input device 225B provides an audio signal $x_M(l)$. The ellipses between the audio input devices 225A and 225B may represent one or more additional audio input devices, or no additional input devices (e.g., M=2). For explanatory purposes, the audio input devices 225A and 225B are microphones (e.g., forming a microphone array) and the audio signals $x_1(l)$ and $x_M(l)$ are microphone signals, although in other embodiments the audio input devices 225A, 225B, and/or other audio input devices may be other types of audio input devices for providing audio signals to the audio subsystem 210.

In some aspects, M may be at least two in order to facilitate spatial audio processing to enhance target audio. When multiple audio input devices are available, the multiple audio input devices may be leveraged to perform spatial processing to improve performance of speech enhancement techniques. Such spatial diversity may be utilized in beamforming and/or other approaches to better detect/extract desired source signals (e.g., a voice of a target audio source) and suppress interfering source signals (e.g., noise and/or voices of other people). In other aspects, M may be one (e.g., a single microphone) with appropriate single audio input processing to enhance target audio.

The audio subsystem 210 may include a multi-channel noise reduction component and a gate component. The multi-channel noise reduction component may facilitate enhancement of an audio signal provided by a speaker of interest (e.g., enhancement of such a target audio source's speech). In an embodiment, the multi-channel noise reduction component may be controlled through an external voice activity detection (VAD). In some cases, the multi-channel noise reduction component may be configured to be geometrically free (e.g., the user can be anywhere in a 360° space). The gate component may mute a signal (e.g., generate muted audio) sent to the voice application 215. For example, the gate component may mute the signal sent to the voice application 215 when a target audio source is not in a view of the video input device 220 and/or is not engaged with the voice application 215. The selective muting may be controlled based on data (e.g., one or more state variables) provided and continuously updated by the video subsystem 205.

The multi-channel noise reduction component and the gate component may operate based at least in part on the multi-channel audio input signal and the supervision signal. For each time sample 1, the audio subsystem 210 generates an output audio signal s(l) (e.g., enhanced audio signal) and provides (e.g., transmits) the output audio signal s(l) for use in the voice application 215. The output audio signal s(l) may enhance an audio component of the multi-channel audio input signal that is associated with target audio (e.g., speech) produced by a target audio source. In this regard, the audio subsystem 210 may analyze each of the audio signals (e.g., analyze each audio channel) and leverage data from the video subsystem 205, such as the supervision signal, to determine whether such an audio component associated with a target audio source is present and process the audio component to obtain the output audio signal s(l).

In some embodiments, the audio/video processing system 200 may be utilized to direct a flow of a voice application session (e.g., a conference, a VoIP call). In an aspect, if a target audio source is determined not to be in a view of the video input device or otherwise not engaged in the voice application session, the audio/video processing system 200 may turn the video input device (e.g., a camera) and/or one or more of the audio input devices (e.g., microphones) on or off (e.g., without requiring manual operation by a user), reduce playback sound, and/or other operations. In some cases, the voice application session may be set (e.g., automatically set) into a sleep mode when the target audio source is not present or not engaged in the session.

For example, the target audio source may be determined to be engaged in the session if the target audio source's gaze is directed at the video input device 220 and/or the target audio source is within a threshold distance of the video input device 220. In some cases, whether the target audio source is engaged may depend on characteristics of the target audio source, such as historical data and/or the target audio source's preferences regarding behavior of the target audio source in relation to the video input device 220. For example, such historical data and/or preferences may indicate whether the target audio source has a habit of being outside the view of the video input device 220 when speaking (or otherwise participating in the session) and/or whether the target audio source gazes at the video input device when speaking (or otherwise participating in the session).

Using various embodiments, the audio/video processing system 200 may authenticate a certain user (e.g., designate/identify a target audio source) and automatically control of a voice application session. Audio noise reduction may be supervised to enhance the authenticated user and remove any surrounding noise, including noise attributable to any unauthorized speaker outside or inside the view of the video input device 220. In some cases, the voice application session may be set (e.g., automatically set) into a sleep mode when the target audio source is not present or not engaged in the session.

Each of the video subsystem 205 and the audio subsystem 210 may include appropriate input/interface circuitry to receive and process video signals and audio signals, respectively. Such input/interface circuitry may be utilized to implement anti-aliasing filtering, analog-to-digital conversions, and/or other processing operations. It is noted that FIG. 2 illustrates a transmit side of the audio/video processing system 200. In some cases, the audio/video processing system 200 also includes a receive side to receive audio signals and/or video signals and provide the received signals to output devices.

Figure 3:
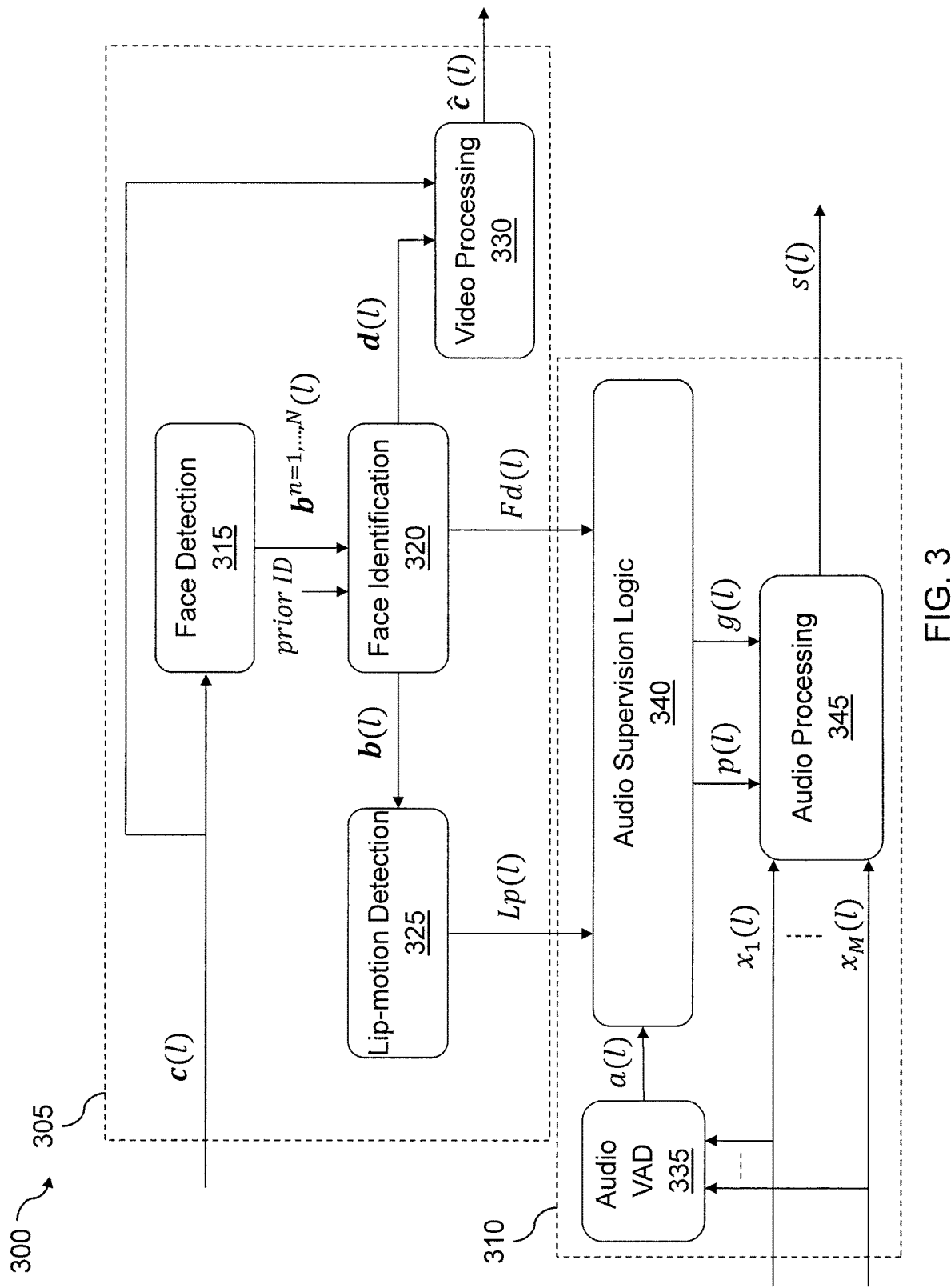
FIG. 3 illustrates an example system that includes a video subsystem and an audio subsystem in accordance with one or more embodiments of the present disclosure.

FIG. 3 illustrates an example system 300 that includes a video subsystem 305 and an audio subsystem 310 in accordance with one or more embodiments of the present disclosure. Not all of the depicted components may be required, however, and one or more embodiments may include additional components not shown in the figure. Variations in the arrangement and type of the components may be made without departing from the scope of the claims as set forth herein, including additional components, different components, and/or fewer components. In an embodiment, the video subsystem 305 may be, may include, may be a part of, or may otherwise implement the video subsystem 205 of FIG. 2 or a portion thereof. In an embodiment, the audio subsystem 310 may be, may include, may be a part of, or may otherwise implement the audio subsystem 210 of FIG. 2 or a portion thereof.

The video subsystem 305 includes a face detection component 315, a face identification component 320, a lip-motion detection component 325, and a video processing component 330. The face detection component 315 (e.g., also referred to as and/or implemented by a face detector) receives an input video frame c(l) from a video input device (e.g., a camera). In this regard, the video input device may capture the input video frame c(l) and provide the input video frame c(l) to the face detection component 315. The input video frame c(l) includes image data within a view (e.g., also referred to as a field of view) of the video input device.

For the input video frame c(l), the face detection component 315 detects for faces in the input video frame c(l) and generates a face detection signal for each detected face in the input video frame c(l). If no faces are detected in the input video frame c(l), the face detection signal generated by the face detection component 315 may be indicative of the lack of detected faces in the input video frame c(l). In FIG. 3, the face detection component 315 detects N faces in the input video frame c(l) and generates face detection signals $b''(l)$, where n=1, . . . , N and each face detection signal is associated with a respective face detected in the input video frame c(l). In this regard, the face detection component 315 provides a face detection signal for each speaker present in the view of the video input device. As such, the face detection signals $b''(l)$ may be referred to as detected faces or as corresponding to detected faces. For example, $b^1(l)$ is a face detection signal associated with (e.g., corresponding to) a first speaker, $b^2(l)$ is a face detection signal associated with a second speaker, and so forth. It is noted that an index/identifier (e.g., first, second) associated with each speaker may generally be arbitrary and utilized for convenience for identifying different speakers. The face detection component 315 provides the face detection signals $b''(l)$ to the face identification component 320.

The face detection component 315 may determine a location of any faces in the input video frame c(l). The face detection signal $b''(l)$ may be, or may include, data indicative of a location of the detected face. By way of non-limiting examples, the face detection component 315 may utilize a histogram of gradients approach, a Viola Jones approach, a convolutional neural network (CNN) approach (e.g., such as a multi-task CNN (MTCNN) approach), and/or generally any other approach appropriate to facilitate face detection. In some cases, each of these approaches may model human faces using a set of generic patterns that output a high response if applied to a face image at a correct location and correct scale. In an aspect, each of the face detection signals b″(l) is a bounding box (e.g., also referred to as a face box) that represents a location and a size of a face detected in the input video frame c(l). For example, the location and/or the size of a detected face may be represented as coordinates of the input video frame c(l). In some cases, the input video frame c(l) may be visually adjusted such that each detected face in the input video frame c(l) has a bounding box drawn around it.

In some aspects, in addition to location and size, the face detection component 315 and/or other detection component may identify features of the detected faces, such as facial landmarks. In one example, an MTCNN-based face detector may output, for each detected face, coordinates of an approximate location of the two eyes, the nose, and the two extremes of the mouth. These facial landmarks may be utilized to align/warp a face to a generic front face, which generally facilitates face recognition (e.g., makes face recognition easier). In an aspect, the face detection component 315 may include a face detector to output bounding boxes and one or more landmark detectors to identify facial landmarks.

The face identification component 320 (e.g., also referred to as an identification component, a recognition component, or a face identifier) receives the face detection signals b″(l) from the face detection component 315 and processes the face detection signals b″(l) to determine whether any of the face detection signals b″(l) is associated with a target audio source (e.g., an authorized user). The target audio source may be the user using the audio/video processing system 300, such as for conferencing applications. In this regard, in an embodiment, the target audio source is the user whose target audio (e.g., voice) is to be enhanced by the audio/video processing system 300.

Based on the determination of whether any of the face detection signals b″(l) is associated with the target audio source, the face identification component 320 generates a face detection signal b(l) and a face detection state Fd(l). In some cases, the face identification component 320 may also generate a signal d(l) based on the determination. The signal d(l) may include data, such as a bounding box and/or face landmark detection, that facilitates processing of the input video frame c(l). The face identification component 320 may determine that one of the face detection signals b″(l) is most likely to be associated with the target audio source. This face detection signal may be provided as the face detection signal b(l). The face identification component 320 transmits the face detection signal b(l) to the lip-motion detection component 325. For example, if the face associated with the face detection signal $b^3(l)$ is determined to have a highest likelihood of being the target audio source (e.g., compared to the remaining face detection signals), the face identification component 320 sets $b(l)=b^3(l)$ and transmits the face detection signal b(l) to the lip-motion detection component 325. In some cases, the face identification component 320 may determine that none of the detected faces can be associated with the target audio source (e.g., none of the detected faces have at least a minimum threshold likelihood of being the target audio source).

The face detection state Fd(l) generated by the face identification component 320 may be indicative of whether an authorized user is determined to be present in the input video frame c(l). In this regard, the face detection state is a signal that is indicative of a likelihood (e.g., probability, confidence score) that an audio source identified by the face detection state Fd(l) is the target audio source. In one aspect, the face detection state Fd(l) may be a binary signal. For instance, in these cases, the face detection state Fd(l) may be 1 only when the target audio source is detected (e.g., determined to be) in the view of the video input device and 0 otherwise. In some cases, the face detection state Fd(l) may take into consideration whether the target audio source is determined to be engaged with the voice application. In these cases, the face detection state Fd(l) may be 1 only when the target audio source is detected in the view of the video input device and is engaged in the voice application and 0 otherwise. For example, the target audio source may be determined to be engaged based on a direction of a gaze of the target audio source and/or a distance estimated to be between the target audio source and the video input device. In another aspect, the face detection state Fd(l) is not binary and may be a likelihood (e.g. between 0 and 1) that an audio source identified by the face detection state Fd(l) is the target audio source.

In some aspects, to make the determination, the face identification component 320 may determine if any of the detected faces associated with the face detection signals b″(l) is sufficiently close to a prior facial identifier (denoted as prior ID in FIG. 3), also referred to as a predefined facial identifier. The prior facial identifier may be, or may be associated with, a face of the target audio source (e.g., authorized/authenticated user) of the audio/video processing system 300. In an aspect, the prior facial identifier may be data, such as an image, of the target audio source that can be compared with the faces detected in the input video frame c(l).

As one example, the prior facial identifier may be determined during an active enrollment/registration stage. For instance, in some cases, a person who intends to use the audio/video processing system 305 and/or other component associated with facilitating a voice application may need to subscribe or otherwise register to use associated equipment and/or software. The prior facial identifier may be a preregistered face. In this regard, a user preregisters himself or herself as an authorized user of the audio/video processing system 300 (e.g., at least for purposes of using a voice application, such as the voice application 215 of FIG. 2). The user may then proceed to utilize the voice application immediately after enrollment/registration and/or at a later time. As another example, the prior facial identifier may be determined at a start of a voice application session (e.g., a call) by assuming the target audio source (for purposes of the voice application session) is the main frontal face in the field of view of the video input device. In this regard, the audio/video processing system 305 identifies that the user positioned in front of a video input device communicatively coupled to the audio/video processing system 305 as being the target audio source. In some cases, the determination/identification of a face as being associated with an authorized user may be based on a size and/or a direction of a gaze of the face. For instance, a person with a largest face in front of the view of the video capture device may be determined to not be an authorized user if the person's gaze is distant from the video capture device (e.g., the person is not engaged with the video capture device) or if the person walks past the video capture device. In some cases, whether a person who intends to use the audio/video processing system 305 to facilitate an application (e.g., a voice application) without prior enrollment/registration may be dependent on settings from an owner and/or a manufacturer of the audio/video processing system 305 and/or other component associated with facilitating the application, dependent on settings (e.g., security settings, privacy settings) from a provider of the application, and/or dependent on other entities and/or factors.

In some aspects, recognition/identification of a user does not involve determining an actual identity of the user and does not involve storing data (e.g., biometrics such as characteristics of facial landmarks) of users. In this regard, recognizing/identifying a user may involve being able to distinguish a certain user from other users (e.g., based on facial characteristics and/or without determining any actual identities) during one session or multiple sessions, with data to make such distinctions obtained from analyzing images containing faces and/or analyzing audio (e.g., voices) utilized.

In some aspects, deep video embeddings may be utilized as, or as part of, the processing of the face detection signals b″(l) to determine if a face (e.g., facial landmarks) is sufficiently close to a prior facial identifier. The face identification component 320 may recognize faces, such as the face of a target audio source, using a deep convolutional neural network (DCNN)-based approach. In such an approach, the face identification component 320 may receive facial landmarks (e.g., location, size, and/or shape of a person's lips, nose, eyes, forehead, etc.) in the input video frame c(l). In some cases, the facial landmarks may be received by the face identification component 320 from the face detection component 315. The DCNN may be trained to embed (e.g., map) a given face image patch into a D dimensional vector $f$. This DCNN maps face images of the same individual to the same or similar vector $f$ independent of environmental condition differences and/or minor pose differences affecting the face images. A similarity between any two faces (e.g., a first face having an embedding vector $f_1$ and a second face having an embedding vector $f_2$) may be determined (e.g., computed, represented) via a metric, such as an L2 similarity or cosine similarity, between their corresponding embedding vectors $f_1$ and $f_2$. To avoid false positives, a similarity between face vectors of two different individuals is preferably sufficiently large (e.g., similarity between the face vectors is above a threshold).

To train such a network, availability of a face dataset is assumed. In some cases, the face dataset may include face images of individuals available with varying poses, lighting, makeup, and other real-world conditions (e.g., MS-Celeb-1M, CASIA-Webface). Each training batch for the DCNN may include data triplets sampled from the face dataset. Each data triplet may include a face image of an individual (e.g., termed anchor(a)), another face image of the same individual with some real-world variations (e.g., termed positive (p)), and a face image of a different individual (e.g., termed negative (n)). To begin the training process, weights of the DCNN may be initialized randomly. This randomly initialized DCNN may be utilized to determine a face vector for each of the three face images of a given triplet so as to minimize a triplet loss. The triplet loss may require that the DCNN be penalized if a distance between the anchor and the positive face vectors is large or, conversely, if a distance between the anchor and negative face vectors is small.

In some aspects, alternatively or in addition to the foregoing approaches, the face identification component 320 may utilize other approaches to facilitate detection of a target audio source. The face identification component 320 may perform face recognition using an eigenface approach (e.g., involves learning a classifier on top of eigenvectors of a covariance matrix of a set of face image), and/or may compute line edge map for all the faces of a dataset and utilize a classifier to distinguish an incoming face image. Various approaches may utilize user faces that have been previously enrolled (e.g., previously registered for purposes of using a voice application or other application).

The lip-motion detection component 325 receives the face detection signal b(l) and detects for any lip motion associated with this detected face (e.g., determined to be the target audio source). Whether or not the target audio source is speaking may be based at least in part on any detected lip motion. The lip-motion component 325 generates a lip motion detection state Lp(l) and transmits the lip motion detection state Lp(l) to the audio supervision logic component 340. The lip-motion detection state Lp(l) is indicative of a probability (e.g., likelihood, confidence score) of whether or not the lips of the target audio source are moving. In some cases, the lip-motion detection state Lp(l) is indicative of a probability (e.g., likelihood, confidence score) of whether or not the target audio source is speaking.

To detect for lip motion, the lip-motion detection component 325 may identify (e.g., place, locate) multiple landmarks on the lips of the detected face associated with the face detection signal b(l). In some cases, for a given face, a relative distance between the upper lip and the lower lip may be determined (e.g., estimated) to determine whether the lips are open or closed. If the relative distance changes sufficient (e.g., changes above a threshold amount) across frames (e.g., captured by the video input device), the lip-motion detection component 325 may determine that the lips are moving.

The video processing component 330 may receive as an input a face detection output including a bounding box and face landmark detection. As an example, in one embodiment, the video processing component 330 is implemented as a background blur component. In such an embodiment, such information (collectively represented as the signal d(l)) may be utilized to define a mask around the face. The mask identifies/denotes parts of the input video frame c(l) to be blurred by the background blur component. Whether the bounding box or a convex hull polygon of the face landmarks are used, a morphological dilation of the detected face area may be performed, such that the hair of the person and the neck are not blurred out. The blur itself may be a Gaussian blur, a box blur, or generally any other kind of blur. The blur may remove high-frequency information from the input video frame c(l), so that if there are other people in the input video frame c(l), their faces cannot be recognized after the blur is applied. In some cases, an entire background region can be replaced by a single color. The single color may be an average background of a scene. In some cases, the background region may be replaced with a user-selected static background or user-selected moving background. As an example, independent of an actual location of the authorized user, the background region may be replaced with an office background or a nature-inspired background (e.g., selected by the authorized user). In some cases, removing, replacing, and/or blurring the background region may enhance privacy (e.g., of the target audio source, other people, and/or a location).

Based on the signal d(l), the background blur component may blur any area surrounding the face of the detected authorized user. In one aspect, the signal d(l) provides a mask area that identifies an area of the input video frame c(l) that surrounds the face of the detected authorized user. Alternatively, the signal d(l) provides an area of the face, such that the background blur component blurs any area outside the area of the face. In some cases, blurring may provide privacy (e.g., for the authorized user and/or the authorized user's surroundings) and/or facilitate detection of the target audio source (e.g., as other aspects of the input video frame are blurred). In some cases, if no target audio source is detected, the entire input video frame is blurred or blanked.

Figure 4:
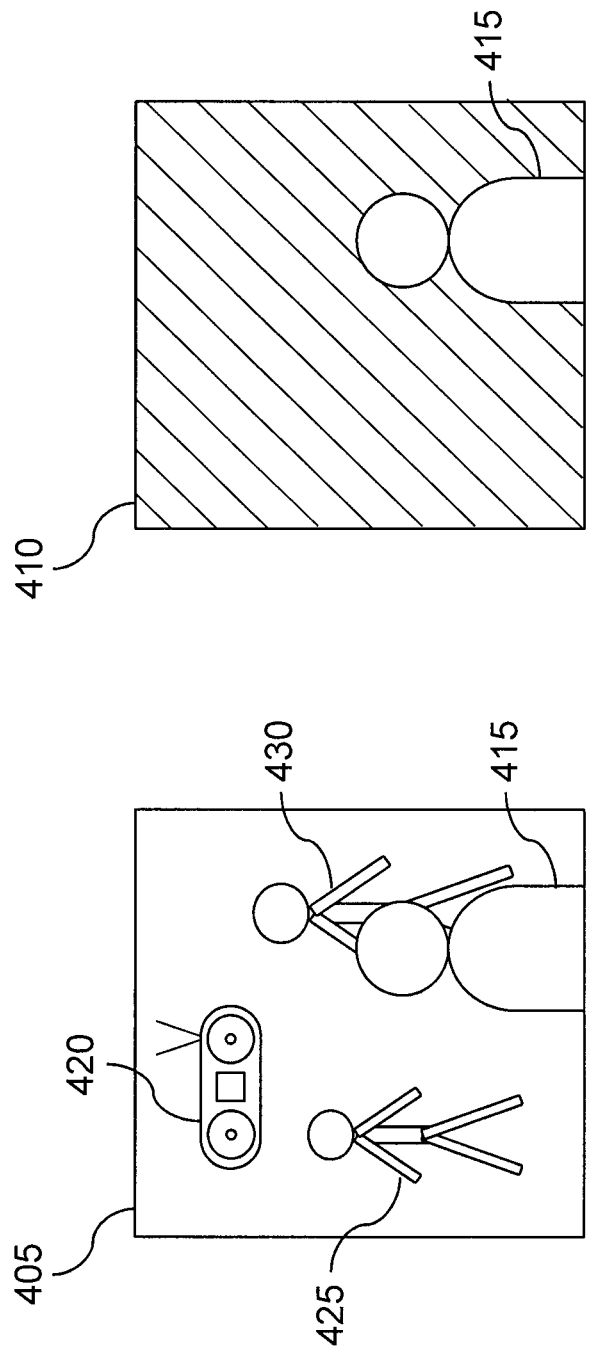
FIG. 4A illustrates an example of an input video frame.
FIG. 4B illustrates an example of an output video frame obtained by processing a background of the input video frame of FIG. 4A in accordance with one or more embodiments of the present disclosure.

FIGS. 4A and 4B illustrate an example of an input video frame c(l) (labeled 405) and an output video frame ĉ(l) (labeled 410) obtained by processing a background of the input video frame c(l) in accordance with one or more embodiments of the present disclosure. In FIG. 4A, the input video frame 405 includes a person 415 determined (e.g., by the face identification component 320) to be the target audio source, a stereo 420, a person 425, and a person 430. As shown in FIG. 4B, the input video frame 405 is processed such that the output video frame 410 includes the person 415 and a remainder of the input video frame 405 (e.g., its background) is replaced with a diagonal line background. It is noted that, in some cases, the video subsystem 305 may include an object detection component (e.g., also referred to as an object detector) to detect objects, such as the stereo 420, in the input video frame that can be sources of noise. Detected objects may be identified and utilized to facilitate audio noise reduction.

Since the background blur component receives face detection input at every frame, the background blur component may implement a blur of the background that is consistent with (e.g., tracks) the authorized user's movements. For example, the blur of the background may follow the target audio source as the target audio source stands up, moves his or her head, and so forth. In some cases, an entire body of the target audio source captured in a video frame by the video input device may be segmented, so that the target audio source's hands and/or other body parts are not blurred out. For instance, by not blurring out the authorized user's body parts, the authorized user may convey data using body language and gestures. Segmentation may be performed using semantic segmentation based on DCNN or body-pose estimation (e.g., OpenPose based on DCNN).

Although the foregoing describes an embodiment in which the video processing component 330 applies a blur to the input video frame c(l), the video processing component 330 may process the input video frame c(l) in other manners alternative to or in addition to applying a blur. As one example, a filter may be applied to the input video frame c(l) to enhance visibility of the target audio source. As another example, in certain applications, a filter may be applied to the input video frame c(l) to adjust an appearance of the target audio source, such as for privacy concerns and/or based on preferences of the target audio source. In some cases, the video processing component 330 is optional. For example, in some cases, no processing component is utilized, such that the output video frame ĉ(l) may be the same as the input video frame c(l).

Turning now to the audio subsystem 310, the audio subsystem 310 includes an audio VAD component 335, an audio supervision logic component 340, and an audio processing component 345. The audio VAD component 335 receives the multi-channel audio signal (formed of the audio inputs $x_1(l), \ldots, x_M(l)$) and generates a VAD signal a(l) based at least in part on performing VAD techniques on the multi-channel audio signal. The audio VAD component 335 may be an external audio-based VAD (e.g., based on neural network inference). The audio VAD component 335 may utilize any appropriate VAD techniques to identify different parts of an audio signal and determine whether any part (e.g., any audio component) of the audio signal can be attributed to a target audio source. In this regard, VAD may be utilized to determine whether a target audio source is speaking (e.g., producing target audio). In some embodiments, VAD may be utilized with multi-channel speech enhancement techniques such as generalized eigenvalue (GEV) beamforming (e.g., also referred to as maximum SNR beamforming) techniques and supervised independent vector analysis (IVA) techniques. For instance, beamforming techniques incorporating generalized eigenvector tracking may be utilized to enhance target audio in received audio signals.

In some aspects, the audio VAD component 335 may be utilized to determine whether an audio input is speech and not speech, and the video subsystem 305 (e.g., Lp(l) and Fd(l) provided by the video subsystem 305) may be utilized to determine whether an activity is a target audio (e.g., target speech) or interfering audio (e.g., interfering speech). In this regard, the audio VAD component 335 in some cases is not utilized to distinguish between two (or more) speakers. For instance, the VAD signal a(l) may be indicative of a probability (e.g., likelihood, confidence score) that a person is speaking. A false positive associated with identifying that a target audio source is speaking when the target audio source is not speaking may occur when an audio modality alone is utilized and similarly may occur when a video modality alone is utilized. For instance, for the video modality, the lip-motion detection state Lp(l) may sometimes produce false positives. As an example, during a conversation, a speaker may produce movements of the lips without emitting sound. Using various embodiments, false detections associated with identifying that a target audio source is speaking when the target audio source is in actuality not speaking may be reduced by combining together audio and video modalities. In one case, the audio and video modalities may be combined by taking a minimum value (e.g., the smaller value of) a(l) and Lp(l) to reduce false detections of each modality, as discussed with respect to the audio supervision logic component 340.

The audio supervision logic component 340 generates an audio-video VAD supervision signal p(l) and a hard gate signal g(l). The signals p(l) and g(l) are generated based at least in part on the face detection state Fd(l), the lip-motion detection state Lp(l), and the VAD signal a(l). In some cases, the audio supervision logic component 340 may apply a non-linear combination of the face detection state Fd(l), the lip-motion detection state Lp(l), and the VAD signal a(l) to generate the signals p(l) and g(l). The face detection state Fd(l) and the lip-motion detection state Lp(l) may collectively provide the supervision signal illustrated in FIG. 2. In this regard, the face detection state Fd(l) and the lip-motion detection state Lp(l) provides data that facilitates audio processing by the audio subsystem 310.

As an example, assuming (for explanatory purposes only) all the state variables (e.g., Lp(l), Fd(l), a(l), and/or others) to be binary or bounded in the range between 0 and 1, p(l) may be defined as the minimum value between a(l) and Lp(l) (e.g., $p(l)=\min(a(l), Lp(l))$). In this example case, in utilizing a "min" combination, it may be assumed that each modality (e.g. audio and video) was designed to produce a target speech detection with more false positives than false negatives. Similarly, as an example, g(l) may be defined as the minimum value between Fd(l) and a(l) (e.g., $g(l)=\min(a(l), Fd(l))$). In some cases, for g(l), temporal smoothing may be applied to prevent the gating from producing unpleasant fast discontinuities.

In some aspects, such data from the video subsystem 305 may facilitate utilization of VADs (such as neural network-based VADs), which are generally utilized to identify parts of a signal in cases where there is a high confidence to observe interfering noise in isolation, even in cases when noise includes speech produced by an interfering speaker(s). In such cases, noise reduction can be facilitated by utilizing the audio modality as well as the video modality (e.g., supervision by the video subsystem 305), rather than exclusively utilizing the audio modality.

The audio-video VAD supervision signal p(l) may control estimation of a noise and speech statistic of an adaptive multi-channel filter. The audio-video VAD supervision signal p(l) may be indicative of a probability (e.g., likelihood, confidence score) that an audio component of the multi-channel audio signal actually belongs to the target audio source (e.g., enhancement is being performed on the correct audio component). The hard gate signal g(l) may be utilized to hard mute or unmute an output signal. For example, the hard gate signal g(l) may be utilized to hard mute an output signal when there is a high probability (e.g., based at least in part on values of Fd(l) and Lp(l)) that no target audio source is in the view of the video capture device or is engaged in the call. In an aspect, the audio supervision logic component 340 and the audio processing component 345 may collectively implement a multi-channel noise reduction component and a gate component of the audio subsystem 310.

In some embodiments, the audio/video processing system 300 may be utilized to direct a flow of a voice application session (e.g., a conference, a VoIP call). In an aspect, if a target audio source is determined not to be in a view of the video input device or otherwise not engaged in the voice application session, the audio/video processing system 300 may turn the video input device (e.g., a camera) and/or one or more of the audio input devices (e.g., microphones) on or off (e.g., without requiring manual operation by a user), reduce playback sound, and/or other operations. In some cases, the voice application session may be set (e.g., automatically set) into a sleep mode when the target audio source is not present or not engaged in the session. In one case, when the face detection state Fd(l) has a state (e.g., a value) indicative of the target audio source not being in the view of the video input device, the audio/video processing system 300 may mute audio playback (e.g., set the output audio signal s(l) to zero). Muting the audio playback may improve privacy also in a downlink of the voice application session.

Each of the video subsystem 305 and the audio subsystem 310 may include appropriate input/interface circuitry to receive and process video signals and audio signals, respectively. Such input/interface circuitry may be utilized to implement anti-aliasing filtering, analog-to-digital conversions, and/or other processing operations. It is noted that FIG. 3 illustrates a transmit side of the audio/video processing system 300. In some cases, the audio/video processing system 300 also includes a receive side to receive audio signals and/or video signals and provide the received signals to output devices.

Thus, using various embodiments, generating of enhanced audio signals (e.g., s(l)) from a multi-channel audio signal is facilitated through utilization of video signals (e.g., c(l)). Recognizing/identifying a user from video input signals (e.g., c(l)) and audio input signals (e.g., multi-channel audio signals) and generating appropriate output video signals (e.g., ĉ(l)) and output audio signals (e.g., s(l)) may involve being able to distinguish a certain user from other users during one session or multiple sessions of an application (e.g., a voice application). The distinguishing of the certain user from other users may be represented as a probability (e.g., likelihood, confidence score) and may be based at least in part on output signals, such as b″(l), b(l), d(l), Lp(l), Fd(l), a(l), p(l), and g(l) obtained through appropriate analysis of video signals by the video subsystem 305 and of audio signals and output signals (e.g., Lp(l), Fd(l)) of the video subsystem 305 by the audio subsystem 310.

Figure 5:
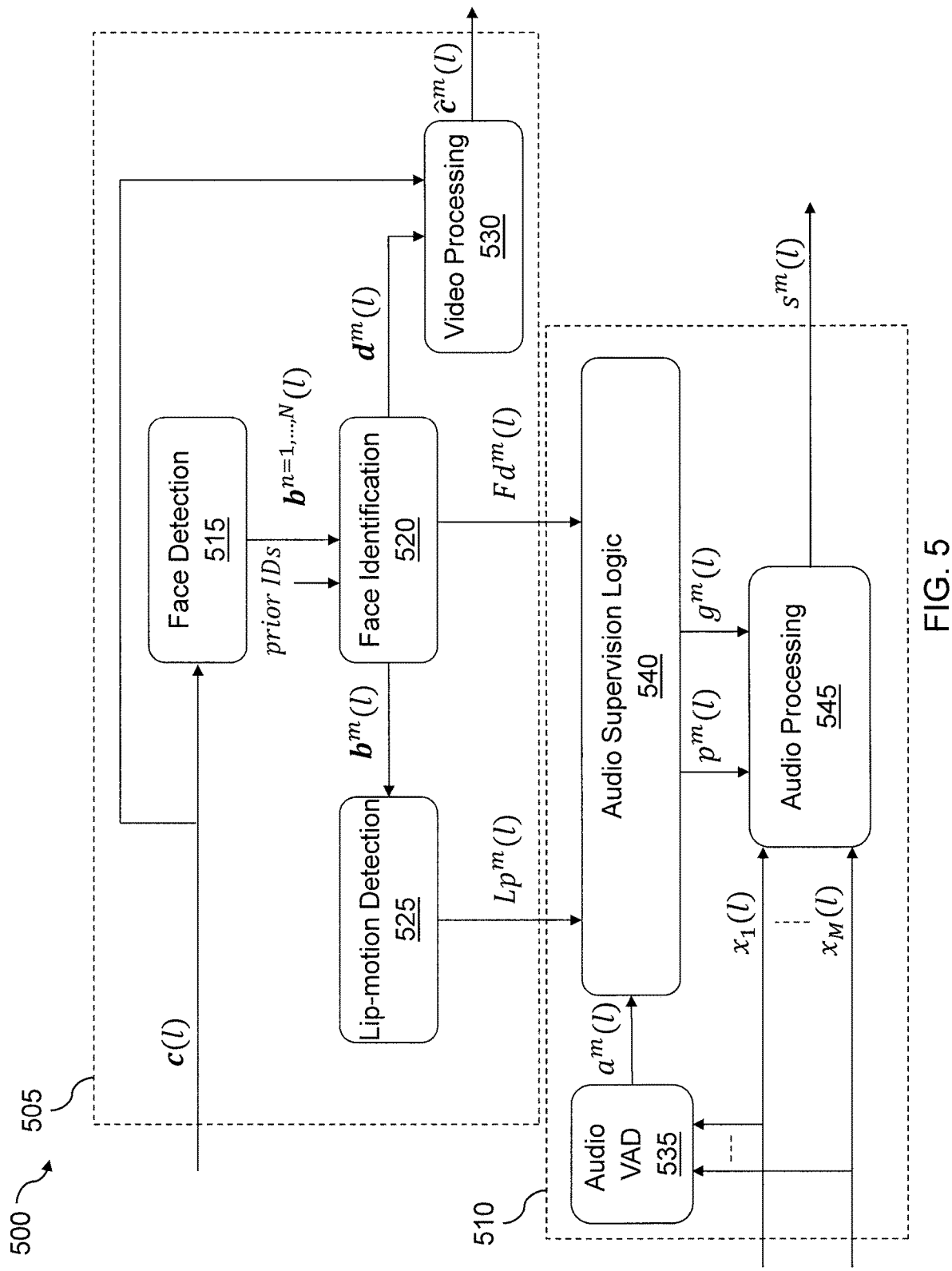
FIG. 5 illustrates an example system that includes a video subsystem and an audio subsystem for supporting multiple target audio sources in accordance with one or more embodiments of the present disclosure.

FIG. 5 illustrates an example system 500 that includes a video subsystem 505 and an audio subsystem 510 in accordance with one or more embodiments of the present disclosure. Not all of the depicted components may be required, however, and one or more embodiments may include additional components not shown in the figure. Variations in the arrangement and type of the components may be made without departing from the scope of the claims as set forth herein, including additional components, different components, and/or fewer components. In an embodiment, the video subsystem 505 may be, may include, may be a part of, or may otherwise implement the video subsystem 205 of FIG. 2 or a portion thereof. In an embodiment, the audio subsystem 510 may be, may include, may be a part of, or may otherwise implement the audio subsystem 210 of FIG. 2 or a portion thereof.

The video subsystem 505 includes a face detection component 515, a face identification component 520, a lip-motion detection component 525, and a video processing component 530. The audio subsystem 510 includes an audio VAD component 535, an audio supervision logic component 540, and an audio processing component 545. The description of FIG. 3 generally applies to FIG. 5, with examples of differences between FIGS. 3 and 5 and other description provided for clarity. In this regard, components of the audio/video processing system 500 of FIG. 5 may be implemented in the same or similar manner as various corresponding components of the audio/video processing system 300 of FIG. 3.

In FIG. 5, the audio/video processing system 500 may be utilized to facilitate audio signal enhancement (e.g., simultaneous audio signal enhancement) for multiple target audio sources. In this regard, enhanced audio streams may be generated for multiple target audio sources. As an example, for an $m^{th}$ target audio source (e.g., $m^{th}$ authenticated user), the face identification component 520 may provide a face detection signal $b^m(l)$, a signal $d^m(l)$, and a face detection state $Fd^m(l)$; the lip-motion detection component 525 may provide a lip-motion detection state $Lp^m(l)$; the audio VAD component 535 may provide a VAD signal $d^m(l)$; the audio supervision logic component 540 may provide an audio-video VAD supervision signal $p^m(l)$ and a hard gate signal $e(l)$; the video processing component 530 may provide an output video frame $ĉ^m(l)$; and the audio processing component 545 may provide an output audio signal $s^m(l)$. The face identification component 520 may associate each detected face with one of a plurality of target audio sources based at least in part on multiple prior facial identifiers (denoted as prior IDs). FIG. 3 illustrates an example case of FIG. 5 in which the audio/video processing system 300 accommodates a single target audio source.

Figure 6:
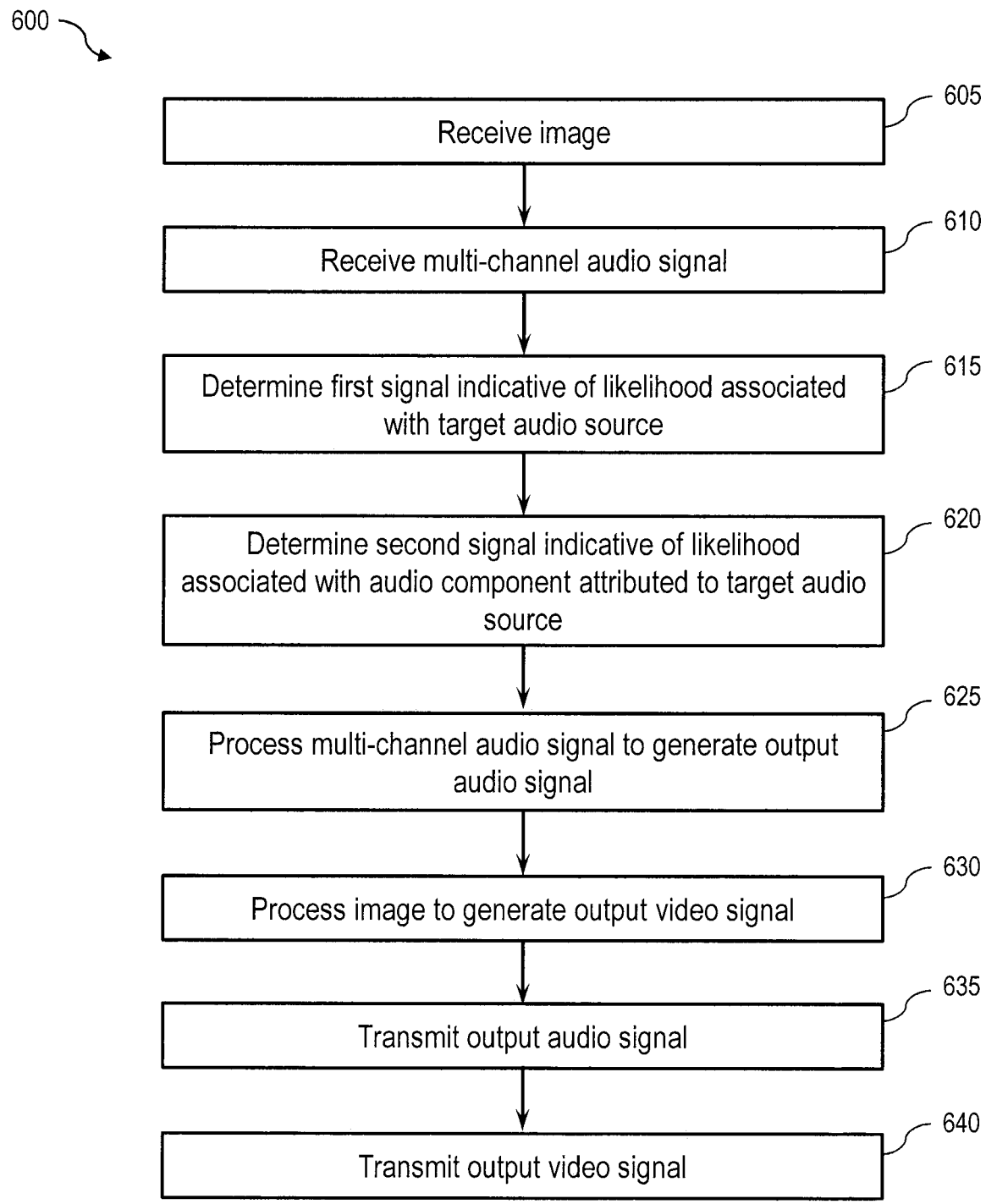
FIG. 6 illustrates a flow diagram of an example process for audio source enhancement facilitated using video data in accordance with one or more embodiments of the present disclosure.

FIG. 6 illustrates a flow diagram of an example process 600 for audio source enhancement facilitated using video data in accordance with one or more embodiments of the present disclosure. For explanatory purposes, the example process 600 is described herein with reference to the audio/video processing system 300 of FIG. 3, although the example process 600 may be utilized with other systems. Note that one or more operations may be combined, omitted, and/or performed in a different order as desired.

At block 605, the video subsystem 305 receives an image (e.g., the input video frame c(l)) captured by a video input device (e.g., a camera). At block 610, the audio subsystem 310 receives a multi-channel audio signal comprising audio inputs (e.g., $x_1(l) \ldots x_M(l)$) detected by a plurality of audio input devices (e.g., microphones).

At block 615, the video subsystem 305 determines a first signal indicative of a likelihood (e.g., probability, confidence score) associated with a target audio source based at least in part on the image. In some aspects, the first signal may be indicative of a likelihood that a detected face in the image is that of the target audio source. In some cases, the first signal may be the face detection state Fd(l) generated by the face identification component 320. The face detection state Fd(l) may be a binary signal or a non-binary signal.

At block 620, the audio subsystem 310 determines a second signal indicative of a likelihood associated with audio attributed to the target audio source. The second signal may be determined based at least in part on the first signal generated by the video subsystem 305 at block 615. In some cases, the second signal may be determined further based on detected lip motion (e.g., the lip-motion detection state Lp(l)) and an audio VAD signal (e.g., a(l)). In some aspects, the second signal may be indicative of a likelihood that an audio component detected in the multi-channel audio signal belongs to the target audio source. In some cases, the second signal may be the audio-video VAD supervision signal p(l) generated by the audio supervision logic component 340.

At block 625, the audio subsystem 310 processes the multi-channel audio signal based at least in part on the second signal to generate an output audio signal (e.g., enhanced audio signal s(l)). At block 630, the video subsystem 305 processes the image to generate an output video signal (e.g., ĉ(l)). In an aspect, the video subsystem 305 may apply blur to the image. At block 635, the audio/video processing system 300 transmits the output audio signal (e.g., for use in a voice application). At block 640, the audio/video processing system 300 transmits the output video signal (e.g., for use in a voice application). In some cases, such as when a voice application involves a voice only call, blocks 630 and 640 may be optional.

Figure 7:
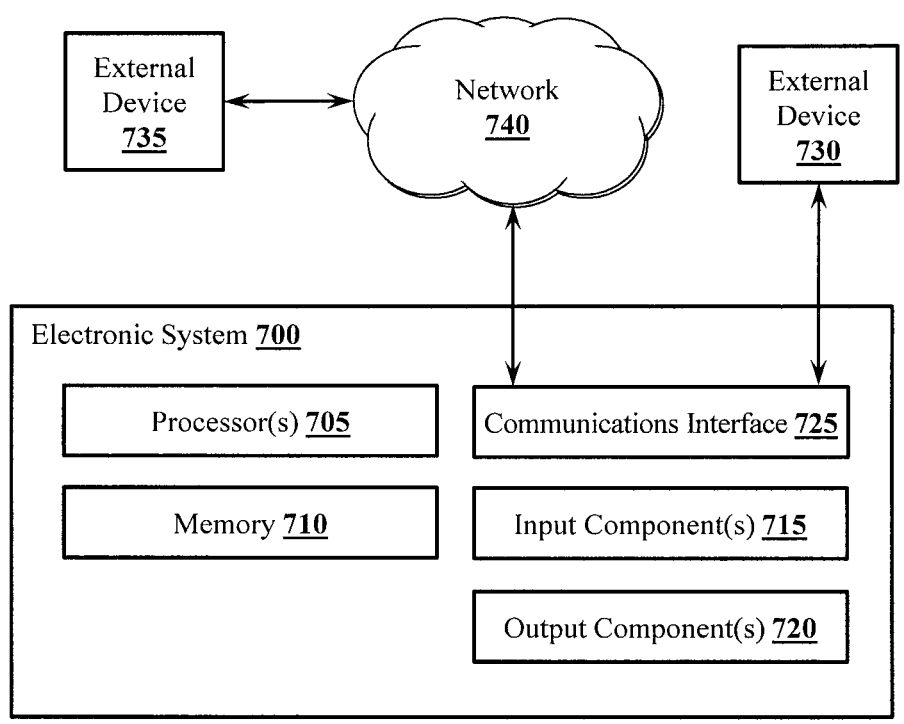
FIG. 7 illustrates an example electronic system for implementing audio source enhancement in accordance with one or more embodiments of the present disclosure.

FIG. 7 illustrates an example electronic system 700 for implementing audio source enhancement in accordance with one or more embodiments of the present disclosure. Not all of the depicted components may be required, however, and one or more embodiments may include additional components not shown in the figure. Variations in the arrangement and type of the components may be made without departing from the scope of the claims as set forth herein, including additional components, different components, and/or fewer components.

The electronic system 700 includes one or more processors 705, memory 710, input components 715, output components 720, and a communications interface 725. Various components of the electronic system 700 may interface and communicate through a bus or other electronic communications interface. The electronic system 700, for example, may be, or may be coupled to, a mobile phone, a tablet, a laptop computer, a desktop, an automobile, a personal digital assistant (PDA), a television, a speaker (e.g., conference speaker with image capture capability), or generally any electronic device that receives audio and video signals (e.g., from audio input devices and video input devices) and transmits signals directly to other devices or via a network.

The processor(s) 705 may include one or more of a processor, a microprocessor, a single-core processor, a multi-core processor, a microcontroller, a programmable logic device (PLD) (e.g., field programmable gate array (FPGA)), a digital signal processing (DSP) device, or other device that may be configured by hardwiring, executing software instructions, or a combination of both, to perform various operations discussed herein for audio source enhancement. In this regard, the processor(s) 705 may be operable to execute instructions stored in the memory 710 and/or other memory components. In an embodiment, the processor(s) 705 may perform operations of various components of the audio/video processing system 120, 200, 300, and 500 of FIGS. 1, 2, 3, and 5, respectively. As an example, the processor(s) 705 may receive a multi-channel audio input signal from audio input devices (e.g., 125A-D in FIG. 1) and an image from a video input device (e.g., 130 in FIG. 1) and process these audio and video signals.

The memory 710 may be implemented as one or more memory devices operable to store data, including audio data, video data, and program instructions. The memory 710 may include one or more types of memory devices including volatile and non-volatile memory devices, such as random access memory (RAM), read-only memory (ROM), electrically-erasable programmable read-only memory (EEPROM), flash memory, hard disk drive, and/or other types of memory.

The input components 715 may include one or more devices to receive input. In an aspect, the input components 715 may include may include a touchscreen, a touchpad display, a keypad, one or more buttons, dials, or knobs, and/or other components operable to enable a user to interact with the electronic system 700. In some cases, the input components 715 may include an audio input device(s) (e.g., microphones) or a video input device(s) (e.g., camera). For example, the input components 715 may provide input audio signals and input video signals to the processor(s) 705. In other cases, the input components 715 do not include the audio input device(s) and/or the video input device(s) that provide input audio signals and input video signals to the processor(s) 705 for purposes of audio source enhancement. The output components 720 may include one or more devices to emit audio and/or video output. In some cases, the output components 720 may include an audio output device(s) (e.g., speaker) or a video input device(s) (e.g., display).

The communications interface 725 facilitates communication between the electronic system 700 and networks and external devices. For example, the communications interface 725 may enable Wi-Fi (e.g., IEEE 802.11) or Bluetooth connections between the electronic system 700 and one or more local devices, such as an external device 730, or enable connections to a wireless router to provide network access to an external device 735 via a network 740. In various embodiments, the communications interface 725 may include wired and/or other wireless communications components for facilitating direct or indirect communications between the electronic system 700 and other devices. As an example, a user(s) of the electronic system 700 may conduct a VoIP call with a user(s) of the external device 735 via a wireless communication between the electronic system 700 and the network 740 and between the network 740 and the external device 735.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   authenticating a user for a voice application;
   receiving a multi-channel audio signal comprising audio inputs detected by a plurality of audio input devices;
   receiving an image captured by a video input device;
   determining, based at least in part on the image and a predefined facial identifier associated with the authenticated user, a face detection signal indicative of a location and/or a size in the image associated with the authenticated user;
   determining, based at least in part on the face detection signal, a lip motion detection signal indicative of lip motion associated with the authenticated user;
   determining an audio-video supervision signal based at least in part on the multi-channel audio signal and the lip motion detection signal, wherein the audio-video supervision signal is indicative of a likelihood associated with an audio component attributed to the authenticated user; and
   processing the multi-channel audio signal based at least in part on the audio-video supervision signal to generate an output audio signal.

2. The method of claim 1, further comprising transmitting, for use in the voice application, the output audio signal to an external device over a network, wherein the processing enhances the audio component attributed to the authenticated user based at least in part on the audio-video supervision signal, wherein the output audio signal comprises the enhanced audio component, and wherein the plurality of audio input devices comprises an array of microphones within an area.

3. The method of claim 1, further comprising:
   determining a face detection state based at least in part on the image and the predefined facial identifier, wherein the face detection state is indicative at least of a likelihood associated with whether the authenticated user is in the image and/or engaged in the voice application;
   performing audio voice activity detection (VAD) on the multi-channel audio signal to generate a VAD signal, wherein the audio-video supervision signal is determined based at least in part on the VAD signal; and
   determining a gate signal based at least in part on the VAD signal and the face detection state, wherein the gate signal selectively sets the multi-channel audio signal to a muted signal.

4. The method of claim 1, wherein the processing the multi-channel audio signal comprises processing the multi-channel audio signal to generate muted audio based at least in part on whether the authenticated user is determined to be in the image, a location of the authenticated user in relation to the video input device, a direction of a gaze of the authenticated user, and/or whether lip motion of the authenticated user is detected.

5. The method of claim 1, further comprising:
   detecting at least one face in the image;
   identifying one of the at least one face to be the authenticated user based at least in part on the predefined facial identifier; and
   determining a direction of a gaze of the authenticated user based at least in part on the image, wherein the audio-video supervision signal is further based on the direction of the gaze.

6. The method of claim 3, further comprising:
   receiving a plurality of images;
   identifying an audio source in the plurality of images as the authenticated user; and
   performing lip motion detection on the audio source based at least in part on the plurality of images, wherein the lip motion detection signal is based on the lip motion detection,
   wherein the face detection state is a binary signal, and
   wherein the binary signal is in a first state based at least in part on the authenticated user being determined to be in the image.

7. The method of claim 1, further comprising:
   determining a location of the authenticated user in the image;
   processing the image to generate an output video signal based at least in part on the location; and
   transmitting the output audio signal and the output video signal to an external device over a network.

8. The method of claim 7, wherein the processing the image comprises blurring a portion of the image based at least in part on the location to generate the output video signal.

9. The method of claim 7, wherein the output video signal comprises an entirely blurred image or entirely blanked image if the authenticated user is determined not to be in the image.

10. The method of claim 1, wherein the voice application comprises a Voice-over Internet Protocol (VoIP) application.

11. The method of claim 10, further comprising setting a session of the VoIP application in a sleep mode based at least on a location of the authenticated user in relation to the video input device.

12. A system comprising:
    a video subsystem configured to receive an image captured by a video input device, the video subsystem comprising:
      an identification component configured to determine a face detection signal based at least in part on the image and a predefined facial identifier associated with a user authenticated for an audio application, wherein the face detection signal is indicative of a location and/or a size in the image associated with the authenticated user; and
      a lip-motion detection component configured to determine a lip motion detection signal based at least in part on the image, wherein the lip motion detection signal is indicative of lip motion associated with the authenticated user; and an audio subsystem configured to receive a multi-channel audio signal comprising audio inputs detected by a plurality of audio input devices, the audio subsystem comprising:

a logic component configured to determine an audio-video supervision signal based at least in part on the multi-channel audio signal and the lip motion detection signal, wherein the audio-video supervision signal is indicative of a likelihood associated with an audio component attributed to the authenticated user; and an audio processing component configured to process the multi-channel audio signal based at least in part on the audio-video supervision signal to generate an output audio signal.

13. The system of claim 12, wherein the video subsystem further comprises a video processing component configured to process, based at least in part on a location of the authenticated user in the image, the image to generate an output video signal, and wherein the video processing component comprises a background blur component configured to blur a portion of the image based at least in part on the location to generate the output video signal.

14. The system of claim 12, wherein:
the identification component is further configured to identify an audio source in a plurality of images as the authenticated user;
the lip-motion detection component is configured to perform lip motion detection on the audio source based at least in part on the plurality of images; and
the lip-motion detection signal is further based on the lip motion detection.

15. The system of claim 12, wherein:
the audio subsystem further comprises an audio voice activity detection (VAD) component configured to perform VAD on the multi-channel audio signal to generate a VAD signal; and
the audio-video supervision signal is determined based at least in part on a minimum of the lip-motion detection signal and the VAD signal.

16. The system of claim 12, wherein the audio processing component is configured to process the multi-channel audio signal to generate muted audio based at least in part on whether the authenticated user is determined to be in the image, a location of the authenticated user in relation to the video input device, a direction of a gaze of the authenticated user, and/or whether lip motion of the authenticated user is detected.

17. The system of claim 13, wherein the video processing component comprises a background processing component configured to replace a background of the image with a single color, a static background, or a moving background to generate the output video signal.

18. The method of claim 1, further comprising determining whether the authenticated user is engaged based at least on data associated with a behavior of the authenticated user in relation to the video input device, wherein the processing is further based on the determination of whether the authenticated user is engaged.

19. The method of claim 1, further comprising determining whether the authenticated user is engaged based at least on historical data associated with the authenticated user in relation to the video input device, wherein the processing is further based on the determination of whether the authenticated user is engaged.

20. The method of claim 3, wherein the gate signal is determined based at least in part on a minimum of the face detection state and the VAD signal.

* * * * *